United States Patent [19]

Minghetti et al.

[11] Patent Number: 5,705,552
[45] Date of Patent: Jan. 6, 1998

[54] THERMOFORMABLE ACRYLIC SHEET HAVING UNIFORM DISTRIBUTION OF COLOR AND MINERAL FILLER

[75] Inventors: Ettore Minghetti; John E. Eitel; Carol A. Wetter, all of Boone County, Ky.

[73] Assignee: Aristech Chemical Corporation, Pittsburgh, Pa.

[21] Appl. No.: 720,164

[22] Filed: Sep. 25, 1996

Related U.S. Application Data

[60] Continuation-in-part of Ser. No. 620,510, Mar. 22, 1996, Pat. No. 5,567,745, which is a division of Ser. No. 392,650, Feb. 23, 1995, Pat. No. 5,521,243, which is a continuation-in-part of Ser. No. 157,253, Nov. 26, 1993, abandoned.

[51] Int. Cl.$^6$ ............................... C08K 3/22; C08L 31/02
[52] U.S. Cl. ..................... 524/437; 525/261; 525/302; 525/309
[58] Field of Search ........................ 523/202; 524/437; 525/261, 302, 309

[56] References Cited

U.S. PATENT DOCUMENTS 5,521,243   5/1996   Minghetti et al. ............... 524/437

*Primary Examiner*—Melvyn I. Marquis
*Assistant Examiner*—D. Aylward
*Attorney, Agent, or Firm*—Robert R. Gavlik

[57] ABSTRACT

A composition suitable for making thermoformable sheets and the like. The composition comprises a crosslinked poly (methyl methacrylate) typically having uncrosslinked poly (methyl methacrylate) dispersed therein. The composition a comprises 0.5 to about 1.0 pph of at least one crosslinking agent x, and up to about 0.58x–0.28 pph of a at least one chain terminator. The composition also comprises about 0.1 to 8 pph poly (methyl methacrylate) compatible plasticizer, and has about 20 to 60 wt % solid particle dispersed therein.

4 Claims, 1 Drawing Sheet

THERMOFORMABLE ACRYLIC SHEET HAVING UNIFORM DISTRIBUTION OF COLOR AND MINERAL FILLER

RELATED U.S. APPLICATION DATA

This is a Continuation-in-Part of Ser. No. 08/620,510 filed Mar. 22, 1996 U.S. Pat. No. 5,567,745 which is a Divisional of application Ser. No. 08/392,650, filed Feb. 23, 1995, U.S. Pat. No. 5,521,243, which is a Continuation-in-Part of Ser. No. 08/157,253, Nov. 26, 1993, abandoned.

TECHNICAL FIELD

This invention relates to poly (methyl methacrylate) ("PMMA") containing compositions useful in the manufacture of sheets or slabs, and methods of manufacturing said sheets. These sheets find use in such applications as kitchen countertops. In addition to PMMA, the above compositions comprise at least one crosslinking agent and at least one chain transfer agent. The concentration of said transfer agent is independent on said crosslinking agent. In the present invention, the amount of chain transfer agent is lower than prior art compositions due to the addition of a small amount of plasticizer. The sheets also contain a significant amount of flame retardant minerals such as alumina trihydrate, and typically contain colorants. These colorants are often used for imitation of natural minerals such as onyx, marble, or other solid color or patterned types having no visibly distinguishable particles. The sheets of the present invention can be heat bent, or thermoformed at an angle as sharp as ninety degrees and/or can be vacuum thermoformed into shapes such as sinks and bowls. shapes such as sinks and bowls.

BACKGROUND OF THE INVENTION

Sheets (used herein interchangeably with slabs) of synthetic mineral appearing material are commonly used as kitchen countertops and interior and/or exterior decorative coverings for buildings and the like. Often the design specifications require sheets to be fitted together or otherwise abut another surface at ninety degree angles.

The fabrication process required under these conditions is both time consuming and expensive. Often there are color differences between abutting surfaces, and the point of contact may be esthetically unappealing. The sheets of the present invention can provide a complex finished part by simple thermoforming operations. For example, to form a vanity top having a ninety degree back splash wall and a front end bull nose of 1.0 inch radius. After forming, cooling and trimming, the part can be installed directly without additional fabrication.

U.S. Pat. No. 3,563,939 and Canadian Patent 916,337 disclose the use of alumina trihydrate ("ATH") in poly (methyl methacrylate) ("PMMA") articles. In U.S. Pat. No. 3,847,865 Duggins discloses the construction of synthetic mineral products. Duggins also discloses the use of crosslinking and mold release agents as well as viscosity reducers such as aliphatic acids.

Buser et al, in U.S. Pat. Nos. 4,085,246 and 4,159,301, discloses the phenomena of particle settling rates suitable for making synthetic granite having a polymerizable methyl methacrylate ("MMA") matrix and PMMA dissolved therein. The PMMA is used to adjust the viscosity which in turn controls the settling rates of the larger particles. The patents further disclose the use of chain-transfer agents as accelerators for polymerization (see '301 at col. 8, lines 58–68). The drawback to these patents is that the sheets cannot be thermoformed to the same extent as the sheets of the present invention.

In Gavin et al, U.S. Pat. No. 4,413,089; uniformity of color is disclosed as an objective. Iron oxide pigment of ten microns or less is uniformly distributed in a syrup of MMA/PMMA. The syrup is then cured.

More recently, Minghetti et al, in U.S. Pat. No. 5,521,243, disclose a composition for making thermoformable sheets. A reference point one-half inch sheet is disclosed as having a minimum bending radius of less than three inches. However, that composition is limited in that when the amount of crosslinking agent "x" is 0.5 pph or more, the amount of chain terminator is no less than 0.58x–0.28 pph. In contrast, the composition of the present invention is drawn to a thermoformable sheet wherein the composition is such that the amount of chain terminator is less than 0.58x–0.28 pph. The composition, and thus the sheets manufactured therefrom, have the unexpected feature of performing almost identically to the '243 composition, but at ratios of crosslinker to chain terminator not thought possible in the '243 invention. The difference is attributable to the addition of at least on plasticizer to the instant composition.

SUMMARY OF THE INVENTION

Figure 1A:
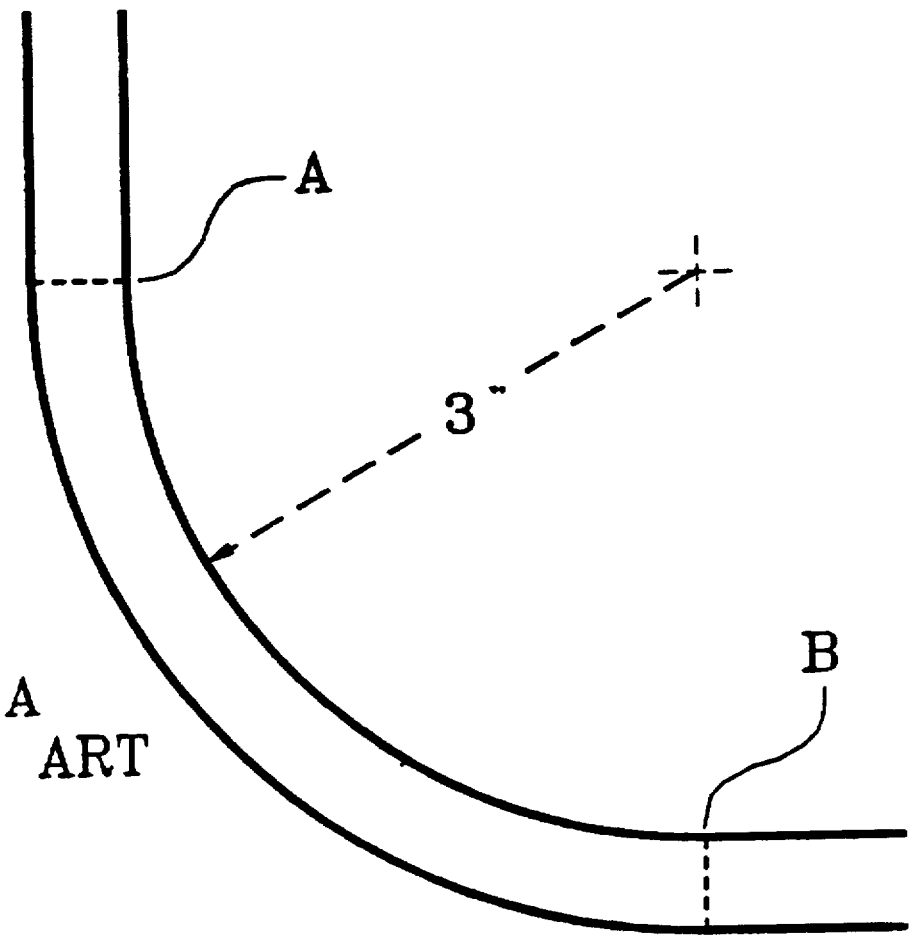
FIG. 1A is a more or less hypothetical illustration of a prior art bending of a one-half inch thick sheet of a contemporary commercial product "Corian" (by DuPont).

The present invention is drawn to compositions, thermoformable sheets and thermoformed articles made therefrom. As used herein, by MMA and PMMA is meant a mixture comprising mainly methymethacrylate monomer or polymethylmethacrylate polymer respectively. Other co-monomers or co-polymers such as butyl acrylate, ethyl acrylate may be present in total amounts up to about twenty percent of the polymerizable portion of the composition. The weight average molecular weight of the PMMA is typically 30,000 to 600,000 and having little or no crosslinked polymer chains to maintain its solubility in MMA. The MMA is typically at least 60 to 80% monomer having about 20 to 40% polymer dissolved therein. However, the monomer content can be in excess of 90%.

The sheets can be heat bent at relatively sharp angles and can be thermoformed into shaped articles without losing the uniform appearance and properties of the top surface. The sheets undergo only minor tolerable color changes across the entire finished part, either less than Delta E=2.0 by Cielab, or not easily discernible by the human eye. The thermoforming temperature is low enough to avoid any significant loss of water from the ATH filler during thermoforming, as is often the case with other thermoplastic materials. The sheet will have a Flame Spread Index, by the ASTM E-84 Tunnel Test lower than 75 and a Smoke Index of 350 or less. The sheet will also have a relatively equal impact resistance, as measured by a falling weight method, as measured from both the top and bottom side.

The present invention provides for the stability of the suspension of alumina trihydrate in a syrup of MMA having PMMA dissolved therein as follows (by weight):

(a) Content of PMMA dissolved in MMA: 0–30 wt %, preferably 10–25 wt %;

(b) ATH in the entire composition: 20–60 wt %, preferably 25–40 wt %;

(c) thixotropic agent (preferably fumed silica) in the monomer/syrup fraction: 0.10–3.5 wt %, or as much as necessary to obtain a viscosity of 1,000–10,000 cps (preferably 2,000–5,000 cps) after mixing, as measured by Brookfield Viscometer Model RVTDV-II, Spindle No. 2, 10RPM;

(d) crosslinking agent as wt % of the total monomer content: greater than 0.5 up to about 1.0 wt % for ethylene glycol dimethacrylate, equivalent content for other crosslinking agents, preferably 0.5 to 1.0 wt %;

(e) chain-transfer agent as wt % of total monomer content up to 0.58x–0.28, where x is the amount of crosslinking agent in pph of ethylene glycol dimethacrylate equivalents, and wherein the amount is based on n-dodecyl mercaptan (other agents may vary the exact content slightly to give results equivalent to n-dodecyl mercaptan);

(f) about 0.1 to about 8 phr (parts per hundred of resin composition) of at least one plasticizer.

As shown above, the crosslinking and chain-transfer agents' concentration will vary slightly depending on the exact agents selected. One way to compare the effects of chain transfer agents is to polymerize MMA in the presence of said agents and in the absence of crosslinkers. The MWw and MWn should be similar to that obtained by n-dodecyl mercaptan. In addition to the above, other ingredients such as dyes, pigments, polymerization initiators may be present. These additional ingredients are well known in the art.

The particulates of the present invention will not be visibly distinguishable in the finished product. Most synthetic granites will contain visibly distinguishable particles of various compositions and colors ranging from 150 to 500 microns. That is, passing through a sieve having openings of 500 microns, but retained on a sieve of openings less than 150 microns. However, larger particles are also used in the art. In the present invention, the use of larger particles can inhibit the even distribution of said particles. In the context of the present invention the majority of particles will be less than about 90 microns, and preferably are mostly less than about 60 microns. The particles' composition is preferably ATH, but may be any composition having similar properties, in particular the flame retardant properties of ATH, it should comprise 25 to 50 weight percent.

The solid surface material of the present invention will typically have a somewhat glossy appearance attributable to the acrylic surface. The particulates will not be discernable, as with simulated granite surfaces, and the appearance can be described as substantially fine grained.

Any number of crosslinking agents, di-functional or tri-functional, may be used. Examples include, but are not limited to the following: ethylene glycol dimethacrylate, propylene dimethacrylate, polyethylene-glycol dimethacrylate, divinyl benzene, diallyl phthalate, 1,3-butanediolmethacrylate, 1,4-butane ethylene glycol dimethacrylate, neopentyl glycol dimethacrylate, trimethacrylate, triallyl cyanurate, pentaerythritol tetramethacrylate, allylmethacrylate, hydroxypropylmethacrylate and hydroxyethyl methacrylate. Preferably, ethylene glycol dimethacrylate is used. Preferably, the amount of crosslink will be at least 0.01% to about 10%.

Chain terminator or chain-transfer agents include, but are not limited to the following: octyl mercaptan, iso-dodecyl mercaptan, thiurams, dithiocarbarumates, dipentene dimercaptan, 2-mercapts ethanol, allyl mercapts-acetates, ethylene glycol dimercapts-acetate, trimethylolethane trithioglycolate, and pentaerythritol tetrathioglycolate. In the present invention the chain terminator serves to regulate the length of the polymer chains and thus to obtain a suitable polymer matrix for thermoforming. Preferably the amount of chain transfer agent used will be at least 0.01% n-dodecyl mercaptan.

The present invention is not limited to a particular subclass of plasticizer provided said plasticizer is compatible with an MMA/PMMA syrup. Any compatible plasticizer known in the art is contemplated by the present invention. The plasticizers included in the present invention will have the feature of lowering the Heat Distortion Temperature (ASTM D-648) of the base formulation. The plasticizers selected can be either monomeric or polymeric. Monomeric plasticizers include phthalates, epoxies, adipates, azelates, trimellitates, glutarates, and citrate esters. These plasticizers are commonly used due to their low cost and suitability to typical applications. Polymeric plasticizers generally consist of polyesters of dibasic fatty acids and polyfunctional alcohols. Extensive lists of MMA/PMMA compatible plasticizers exist in the art. Also, liquid fire retardants containing P, Cl, Br, and the like are understood in the art to plasticize polymeric compositions, and are therefore incorporated in the context of the present invention. At least one plasticizer is added in an amount of about 0.1 to about 8 phr. Preferably, in the amount of about 2 to about 8 phr.

Conventional thickening agents as well as thixotropic agents are particularly suited to the present invention. They are believed to enhance the inertial tendency of a particle to remain stationary in the matrix suspension. Preferably, fumed silica is used. By fumed silica is meant the product formed by the hydrolysis of silicon tetrachloride vapor in a flame of hydrogen and oxygen, to produce solid particles in the range of about seven to 30 millimicrons. Several commercial types of fumed silica are available. The majority of experimentation for the present invention was conducted with CAB-O-Sil M5, which has a surface area of 200 square meters per gram. However, the present invention is not limited to any one particular type.

The surface of fumed silica is hydrophilic due to an abundance of hydroxyl groups. Absorbed moisture in the silica, or in the other components has a gross effect on the final viscosity of the suspension, and normally lowers the viscosity. The same effect can be achieved with other substances which are more or less capable of developing hydrogen bonding.

If the fumed silica and/or ATH are dried to eliminate the absorbed moisture, the final viscosity of the suspension will be higher. However, drying the ATH above 200° F. may hinder its utility as a flame retardant by depleting its water content.

In our preferred compositions, the amount of fumed silica is selected so that the preferred viscosity is obtained, regardless of variations in the other ingredients.

The preferred method of obtaining a desired viscosity is the following:

(A) Mix all the ingredients (MMA, PMMA, ATH, pigments, other additives, catalysts, chain-transfer agent, crosslinking agent, and plasticizer) of the formulation except the fumed silica and measure the viscosity as indicated below. If necessary, adjust the MMA (monomer) content of the syrup to obtain a viscosity of 800 to 1,500 centipoise.

(B) Repeat step A including an amount of fumed silica and measure the viscosity.

(C) Repeat step B to bring the viscosity to a level between 1,000 and 10,000 centipoise, preferably between 2,000 and 5,000 centipoise.

Hellsund's U.S. Pat. No. 3,371,383 and Opel's U.S. Pat. No. 3,376,371, are incorporated herein by reference in their entireties, as these references represent our preferred procedure for formation of sheet material or a continuous cast operation. While the forming of sheets between two moving continuous steel belts is the preferred procedure, it is important to realize that such machines are necessarily prone to vibration and microadjustments which tend to result in an almost unavoidable jostling of the particulates in the syrup; the concentrations of crosslinker, chain terminator, fumed silica, and PMMA prepolymer factor in stabilizing the ATH and/or other solids contributing to an evenly distributed fine-grained appearance.

DETAILED DESCRIPTION OF THE INVENTION

Referring now to FIG. 1A, the recommended (DuPont "Corian" Technical Bulletin CTDC-110, October, 1987) minimum bending radius of three inches for a prior art one-half inch thick flat sheet is illustrated as the radius of the bend in the inside curve from vertical extension point A to horizontal extension point B. Applying the simple formula C=πD, the circumference of a hypothetical three-inch circle would be 18.8496 inches, and the quarter circle AB would measure 4.7124 inches. Applying the same formula to the outside curve for a sheet 0.5 inch thick, i.e. using a radius of 3.5, yields a quarter circle of 5.4953, a difference of 16.6% from the inside curvature. Such a distortion will tend to cause a flow of heated ingredients from the compressed inside curve to the expanded outside, and lengthwise toward points A and B from the curved portion. The flow of ingredients has a tendency to distort the visual or decorative pattern; accordingly, the prior art has minimized the disruptions of the material by using a relatively large radius for the curvature, eg. 3 inches.

Figure 1B:
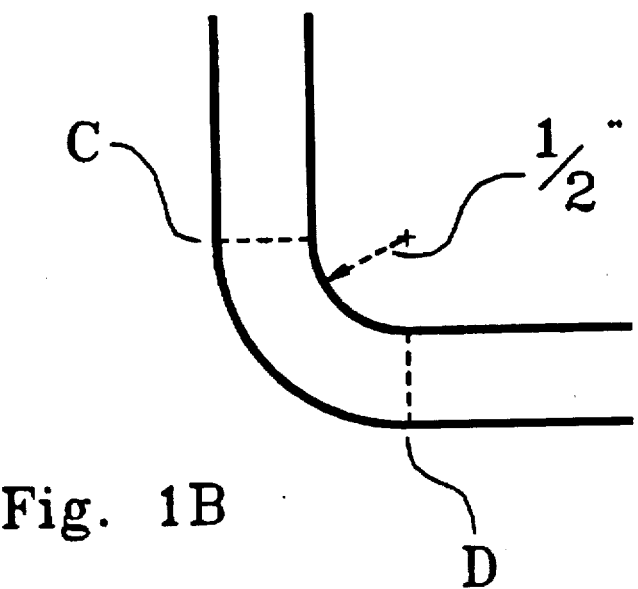
FIG. 1B is a similar illustration of the bending of a one-half inch thick sheet of the present invention.

FIG. 1B illustrates the achievable curvature of a sheet of the present invention, wherein the radius of the curve is one-half inch rather than the three inches of the section of FIG. 1A. In this case, the theoretical circumference of the outside of the curved section CD is 100% greater than that of the inside of the curve. It is readily seen that by enabling such a forming ability, the present invention overcomes a more severe displacement of material in relatively less volume. The relatively more severe displacement of material means a greater potential for distortion of the esthetic pattern, but we avoid or neutralize such distortion and so achieve a continuity of pattern heretofore not achievable under the stress of thermoforming.

A test has been devised to evaluate thermoformability, which is a primary object of the present invention. The test consists of clamping a flat test specimen 4 ⅞ square having the desired thickness onto a steel plate in which has been drilled a 3-inch diameter hole; then a polished stainless steel plunger having a one-inch radius is lowered at a rate of five inches per minute regardless of the resistance. The apparatus and sample are heated prior to the test to the desired temperature. As the plunger moves, a load cell generates a signal representing the amount of resistance in pounds, which may be recorded. At the moment the specimen ruptures, the plunger is stopped and the distance it has traveled is measured. Averaging of tests from four specimens of each sample is recommended. This test may be referred to herein as TP-0085.

The invention is illustrated by, but not limited to the following example:

EXAMPLE 1

Sheet samples of 0.500" thickness were prepared as described in Example 3 of U.S. Pat. No. 5,521,243, from a basic formulation consisting of:

|  | % Weight |
|---|---|
| ATH (Solem OE-431) | 40 |
| MMA/PMMA (20%) Syrup | 59.75 |
| BYK 1142 | .25 |
| n-dodecyl mercaptan | 0.119 phr(*) |
| Ethylene glycol dimetharcylate | 0.135 phr(*) |
| Catalysts | As needed |
| pigments | As needed |
| other additives | As needed |

(*)These amounts correspond to .249% and .282%, respectively, of the MMA present in the formulation.

The samples were poured between two casting plates made of stainless steel, to produce 12"×12" sheets of 0.500" thickness after curing. The curing was obtained by dipping the stainless steel plate assembly into a water tank kept at 180° F. For one hour and then into an air circulating oven, kept at 250° F., for one hour. This was done to evaluate laboratory prepared formulations in which variations of the amount of chain transfer (n-dodecyl mercaptan) and crosslinking agents (ethylene glycol dimethacrylate were made.

Samples 1A, 1B, and 1C were made from the formulation above, with Epoxol 9.5 (epoxidized linseed oil produced by ACS, Inc.) Added as indicated in the table below.

Samples 1G and 1H contained 2 and 4 phr, respectively, of Fyrol RDP, a flame retardant additive containing phosphorus and sold by AKZO. The samples were tested by the thermoforming test method TP-0085, 40 minutes at 340° F. The details of the compositions and the results are listed below:

| | | | TP-0085 | |
|---|---|---|---|---|
| Sample ID Thickness | Added phr of | HDT °F.(*) | Inches at Break At 320° | Lbs. Force at Break F./40 min. |
| 1A/.500" | 4.2 of Exoxol 9.5 | 164.5 | 13.1 | 72 |
| 1B/.500" | 3.0 of Epoxol 9.5 | 183.9 | 11.5 | 99 |
| 1C/.500" | 1.8 of Epoxol 9.5 | 192.9 | 10.7 | 122 |
| 1G/.500" | 2 of Fyrol RDP | Not determined | 4.4 | 46 |
| 1H/.500" | 4 of Fyrol RDP | Not determined | 4.6 | 40 |

(*)Heat Distortion Temperature, at 264 psi, per ASTM D-648

Examples 1A, 1B and 1C show a higher degree of stretch of the sheet at a lower force.

In Examples 1G, 1H a commercial flame retardant added to the formulation shows how the termoforming parameters can be modified while adding flame retardant additives which might be categorized as plasticizers.

Epoxol 9.5 is an epoxidized linseed oil, sold by Swift Chemical Company. Fyrol RDP is a bis-phosphate ester, containing 11% of phosphorus and it is sold by AKZO.

EXAMPLE 2

A syrup was made by partial polymerization of MMA to obtain a viscosity of 3 Poise and a PMMA content about of 20% weight. Butyl Acrylate, Cab-O-Sil M5, Aluminum Trihydrate (ATH) we added to the syrup under agitation. Their proportions are indicated below, together with the chemicals necessary to obtain a complete polymerization and a good release from the call casting plates:

| | % Weight |
|---|---|
| 1-3 syrup (20% PMMA) | 57.20 |
| Butyl Acrylate | 2.00 |
| Cab-O-Sil M5 | 0.53 |
| ATH | 39.92 |
| Wetting Agents | 0.35 |

| | phr |
|---|---|
| Pigment Paste | As needed |
| Release Agents | As needed |
| Catalysts | As needed |
| Chain Transfer Agent | See Table A |
| Crosslinker | See Table A |
| Plasticizer | See Table A |

The mixture of ingredients was handled and polymerized as described in Example 1.

Table A shows the combinations of chain transfer agent, crosslinker and plasticizer used and the test results:

TABLE A

| phr on Total Monomers | | | Heat Dist. | TP-0085(*) | |
|---|---|---|---|---|---|
| Chain Transfer | Crosslinker | Plasticizer | Temp. (°F.) | Inches at Break | Lbs. Force at Break |
| PL-0 .1 | .9 | — | 200.1 | 3.3 | 301 |
| PL-1 .1 | .9 | 4 | 168.8 | 3.2 | 250 |
| PL-2 .1 | .7 | — | 195.2 | 3.7 | 258 |
| PL-4 .1 | .7 | 6 | 155.5 | 3.8 | 206 |

(*)Tested at 340° F./40 minutes heating time.

The data of Table A shows how a certain amount of plasticizer reduces the force needed for thermoforming, see lbs. force of test PL-1 and PL-4 against PL-0 and PL-2, 250 and 206 lbs. against 301 and 258 lbs. respectively. The PL-0 and PL-2 points are outside the region of compositions claimed in U.S. Pat. No. 5,521,243. If a plasticizer is added to them, the performance of the sheet changes and it becomes a candidate for thermoforming, since a lower force is necessary to change its shape and obtain acceptable details in the molded sheet.

We claim:

1. A composition comprising:

(a) a syrup comprising methyl methacrylate and having a polymerizable portion;

(b) 0.5 to about 1.0 parts per hundred, based on the weight of the polymerizable portion, of a crosslinking agent x, said crosslinking agent being dispersed within said syrup;

(c) y parts per hundred of a chain terminator, based on the weight the polymerizable portion, said chain terminator being dispersed within said syrup, and wherein y is less than 0.58x–0.28;

(d) about 0.1 to 8 parts per hundred, based on the weight of the polymerizable portion, of at least one poly (methyl methacrylate) compatible plasticizer; and (e) a plurality of solid particles, said particles passing through a sieve having openings of 90 microns, said particles comprising about 20 to 60 wt % of said composition, and wherein a one-half inch thick flat sheet made from said composition will have a minimum bending radius of less than three inches.

2. A composition according to claim 1 wherein said solid particles comprise alumina trihydrate.

3. A composition according to claim 1 wherein said chain terminator is n-dodecyl mercaptan.

4. A composition according to claim 1 wherein said crosslinking agent is ethylene glycol dimethacrylate.

* * * * *

UNITED STATES PATENT AND TRADEMARK OFFICE
CERTIFICATE OF CORRECTION

PATENT NO. : 5,705,552
DATED : January 6, 1998
INVENTOR(S) : Minghetti et al.

It is certified that error appears in the above-indentified patent and that said Letters Patent is hereby corrected as shown below:

Column 1, Line 32, delete the second occurrence of "shapes such as sinks and"

Column 1, Line 33, delete "bowls."

Column 1, Line 49, after "ninety" insert a -- - --

Column 4, Line 21, after "8 phr" insert a --,--

Column 4, Line 21, delete "Preferably" and insert in its place "preferably"

Signed and Sealed this

Twenty-third Day of November, 1999

Attest:

Q. TODD DICKINSON

*Attesting Officer*     *Acting Commissioner of Patents and Trademarks*